United States Patent [19]
Cook

[11] 3,832,725
[45] Aug. 27, 1974

[54] UNDERWATER HOUSING FOR ENCLOSING PHOTOGRAPHIC APPARATUS

[75] Inventor: Russell P. Cook, Key Biscayne, Fla.

[73] Assignee: Polaroid Corporation, Cambridge, Mass.

[22] Filed: July 9, 1973

[21] Appl. No.: 377,605

[52] U.S. Cl. ............................................. 354/64
[51] Int. Cl. .................................... G03b 17/08
[58] Field of Search .................... 95/11 UW, 13

[56] References Cited
UNITED STATES PATENTS

| | | |
|---|---|---|
| 2,901,143 | 8/1959 | Pope ..................................... 95/11 |
| 2,930,302 | 3/1960 | Tuttle .................................... 95/14 |
| 3,019,715 | 2/1962 | Arnold .................................. 95/11 |
| 3,446,131 | 5/1969 | Cook ..................................... 95/13 |

Primary Examiner—John M. Horan
Attorney, Agent, or Firm—John S. Vale

[57] ABSTRACT

An underwater housing for use with a "self-developing" camera of the type including a mechanism for advancing a film unit from a position within the camera, through an exit opening, and along a film path of travel outside of the camera. The housing encloses both the camera and the external film path of travel and features a transparent port through which the film unit may be observed.

30 Claims, 6 Drawing Figures

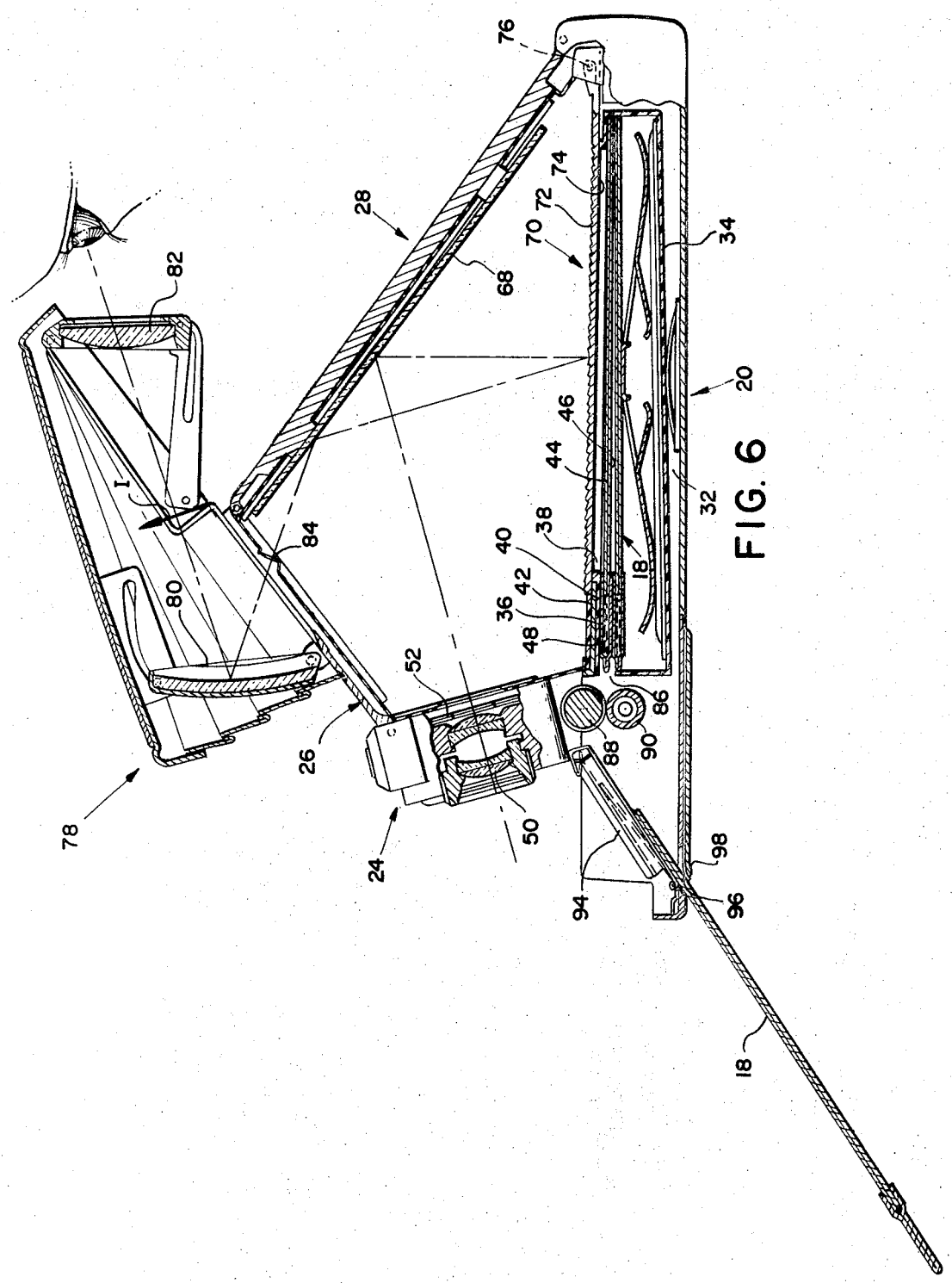

UNDERWATER HOUSING FOR ENCLOSING PHOTOGRAPHIC APPARATUS

BACKGROUND OF THE INVENTION

1. Field of the Invention

The present invention relates to the field of photography and, more specifically, to an underwater housing for a self-developing camera.

2. Description of the Prior Art

Since the first successful underwater photograph was taken in France in 1893 by Louis Boutan, men have taken cameras underwater to provide records of what they saw.

The early underwater photographers were hampered by their heavy and cumbersome diving suits and equally heavy and unwieldy photographic and lighting equipment. They lacked mobility, and making a single underwater photograph was an awesome task.

Through the years diving equipment has improved. SCUBA (self-contained underwater breathing apparatus) equipment has replaced the heavily weighted suit and long air hoses thereby giving the diver mobility and increasing his range of underwater exploration.

Improvements in the diver's photographic and lighting equipment paralleled those improvements made in his diving equipment. Small compact cameras, strobe and flash lighting equipment, inexpensive underwater camera housings, color correction filters, and high speed color film are but a few examples of modern photographic equipment and materials that make present day underwater photography appreciably easier.

In-water photography presents the photographer with many problems that he does not have to contend with on land. His camera must be protected from the water and the hydrostatic pressures of the underwater environment. While there are a few cameras available that have integral waterproof and pressure resistant housings and leakproof camera controls, in most instances the underwater photographer must use some sort of an underwater housing to protect his camera.

In its simplest form, the underwater housing comprises a watertight metal or plastic case for receiving and supporting the camera. A transparent glass or plastic window is provided in front of the camera's objective lens and serves as a picture taking port. One or more leakproof control members pass through the walls of the box for actuating the shutter release button and the film advance mechanism.

This basic housing is all that is needed to protect and operate a simple "snap-shot type" camera in a relatively shallow and clear underwater environment. However, as the camera becomes more complex and the diver descends to deeper depths, additional controls and housing capabilities are required.

For example, if the ambient illumination is insufficient, artificial illumination from flash bulbs or "strobe units" must be employed. In most underwater housings, the flash unit is mounted exteriorly of the housing and a waterproof electrical connector installed in one of the housing walls is required to connect the flash unit to the camera's flash firing and synchronization circuit.

If the camera is equipped with a viewfinder and an adjustable focusing lens, a rear viewfinder port and lens focusing mechanism must be added to the underwater housing. Additional controls may be provided for selecting shutter speed and aperture opening.

Housings adapted for use with single lens reflex cameras generally are configured to accept a number of different taking ports which are specifically designed for various interchangeable objective lenses.

In the more sophisticated underwater housings, the taking port actually forms part of the optical system. By substituting a curved or hemispherical taking port for a planar optical port, undesirable effects such as reduced field of view and image distortion and/or blurring may be minimized or eliminated.

Examples of the above described underwater housings may be found in U.S. Pat. Nos. 685,463; 2,944,474; 2,996,966; and 3,019,715. Also, see German Pat. No. 1,273,977 (1968) and Lawrence E. Mertens, "In-Water Photography," Wiley — Interscience, New York, 1970.

All of the previously described housings are adapted for use with conventional cameras that use conventional film. Upon completion of the driver's photographic mission, he returns to the surface and the housing is opened to recover the cassette of exposed film. The diver then must wait hours, days, or even weeks for the film to be developed and printed before he can view the results.

The well known "self-developing" camera in which a film unit is exposed and then advanced between a pair of compressive pressure-applying members in the camera for distributing a liquid processing composition between superposed film elements and initiating a diffusion transfer process to provide a viewable positive print within a few minutes (or shorter time period) had not wide utility in underwater photography. The main reason for its lack of acceptance is that the film unit had to be manually pulled through the pressure-applying members to withdraw the film unit from the camera. This manipulation was followed by a predetermined development time (up to a minute for color prints, 10 seconds for black-and-white) after which positive and negative sheets forming the film unit had to be separated to view the positive image on the positive sheet.

To the best of my knowledge, only one type of underwater housing has been built for use with this older type of "self-developing" camera. It is described in U.S. Pat. No. 3,168,024 issued to Samuel O. Raymond on Feb. 2, 1965.

The underwater housing comprises a rather large Plexiglas box for receiving and supporting a self-developing camera adapted to use roll-type black-and-white film. The film includes separate rolls of negative and positive material which are brought into superposition after a frame of the negative material has been exposed. The film is then pulled between a pair of juxtaposed rollers in the camera to initiate processing and is withdrawn from the camera through an exit opening at one end thereof.

The underwater housing is provided with a pair of rotatably mounted vertical spindles, one in alignment with the camera's exit opening, the other situated behind the camera. The leading end of the negative roll is attached to the first spindle and the leading end of the positive roll is attached to the second spindle.

The first spindle is adapted to be rotatably driven about its vertical axis by pulling a lanyard on the outside of the housing. A pulley arrangement is provided whereby the second spindle is rotatably driven by the first spindle.

By rotating the first spindle, the negative roll is wrapped therearound and pulls the superposed negative and positive elements through the rollers. The rotating second spindle reels in the positive sheet which separates from the negative and follows a circuitous path around the back of the camera to the second spindle. A transparent print observation port is provided at the back of the housing so that the photographer can observe the positive print before it is completely wound onto the second spindle.

Considering the state of the art at the time of the Raymond invention (1961), his underwater housing performed all of the functions required to allow a diver to make an underwater exposure and to view a positive print of the scene photographed shortly thereafter while in the underwater environment.

In light of the current state of the art of "one step" photography (to be discussed hereinafter), the Raymond housing has several major disadvantages. It is rather large and unwieldy because of the extra volume needed to enclose the film transport mechanism and the long film path of travel outside of the camera. The film transport mechanism is designed to handle roll film whereas the present self-developing cameras are adapted to accept a pack of individual film units. More importantly, the length of the film path to the observation port requires that the photographer take a second picture before the first picture can be seen.

Recently, a new concept in one-step photography has been introduced. It features a compact single lens reflex camera which exposes, initiates processing, and ejects a color film unit from the camera in approximately 1.5 seconds. The film unit includes integral negative and positive elements including a transparent plastic window through which the positive image may be viewed without having to separate or "peel apart" the negative and positive elements. By incorporating an opacifying agent in the processing fluid that is spread between predetermined layers of the film unit as it is ejected from the camera, the initiated development process may be completed outside of the camera housing without further exposure, by ambient light, of the photosensitive materials within the film unit.

At a time when we are energetically exploring our in-water environment in search of minerals, energy fuels, and future food supplies, and are attempting to document and find solutions for water pollution and other environmental hazzards, it is highly desirable to adapt such a photographic system for in-water use.

SUMMARY OF THE INVENTION

The present invention provides a simple, easy to use, and inexpensive underwater housing for a self-developing camera of the type adapted to advance a film unit from an exposure position within the camera, through processing members, and out through an exit opening in the camera such that it travels along a predetermined path exteriorly of the camera.

The underwater housing comprises a watertight and hydrostatic pressure resistant case for enclosing the camera and the film unit path of travel exteriorly of the camera. A transparent port is provided in the case in the vicinity of film unit path of travel so that the underwater photographer may observe the developing positive image which becomes visible within a very short time after the film exits the camera.

In a preferred embodiment, the underwater housing includes a first watertight housing section for receiving and supporting such a self-developing camera and a second watertight housing section coupled to and communicating with the first section for enclosing the film unit path of travel exteriorly of the camera and for receiving and storing film units as they are advanced through the exit opening in the camera.

The first housing section is provided with a first transparent section in a front wall thereof which serves as a picture taking port and a second transparent port in a rear wall of the first housing section through which the camera's reflex viewing device may be viewed. The print observation port is defined by a third transparent section, located on the second housing section, which is disposed in overlying relation to the film unit path of travel.

The underwater housing embodying the present invention has been specifically designed for use with the SX–70 camera which is manufactured and marketed by the Polaroid Corporation, Cambridge, Massachusetts.

It will be understood that this camera has been chosen as a vehicle for illustrating the inventive concepts of the underwater housing and that the underwater housing may be appropriately modified to accept other cameras of this general type.

The SX–70 camera has its film exit slot on the front of the camera below the objective lens. Thus the film unit path of travel, exteriorly of the camera, extends forwardly of the front of the camera housing.

In the preferred illustrated embodiment, the rear wall of the first housing section is adapted to be removed to insert the camera therein. When supported in the first housing section, the camera's objective lens is aligned with the taking port in the forward wall and the film exit opening is aligned with an interior passageway providing communication between the first housing section and the forwardly extending second housing section.

The underwater housing is provided with appropriate leakproof control members which are operative from the extreior of the housing for focusing, adjusting a lighten/darken exposure control member, and actuating a cycle of camera operation.

As noted earlier, the camera includes a mechanism for advancing the film unit through the exit opening in the front of the camera and along a predetermined, generally planar, film unit path of travel exteriorly of the camera body. A friction type of film retaining mechanism associated with the camera exit opening releasably retains the film unit by its trailing end until it is removed by the user at his convenience. However, if a second film unit is advanced from the camera before the first film unit is manually disengaged from the retaining mechanism, the second film unit pushes the first unit out of engagement with the retaining mechanism and is retained thereby by its trailing end when it reaches its fully extended position forwardly of the camera.

In some instances, it may be desirable to release a film unit from the retaining mechanism prior to exposing and advancing a second film unit from the camera because it may be difficult to view a small portion of the trailing end of the film unit's image-forming area while the film unit is so retained. In order to accomplish this function, the underwater housing may be provided with means for disengaging a film unit from the retaining mechanism and for advancing the film unit slightly forwardly of the retained position such that the film unit is fully inserted into the second housing section thereby permitting the film unit's entire image-forming area to be observed through the transparent print observation port.

In one embodiment, the film disengaging and advancing means includes a film engaging friction cam pivotally mounted in one wall of the second housing such that the cam is located just below the film unit path of travel exteriorly of the camera. The cam is adapted to be rotated so as to bring a lobe of the cam into frictional engagement with the underside of a retained film unit extending forwardly of the camera into the second housing section. A slight further rotation of the cam advances the film unit slightly forward to disengage it from the retaining mechanism and thereby fully inserts it into the second housing section for observation and storage.

Therefore, it is an object of the present invention to provide an inexpensive, simply constructed and easy to use underwater housing for enclosing and protecting a self-developing camera and a film unit path of travel exteriorly of such a camera.

It is another object of this invention to provide such an underwater housing which further includes a transparent print observation port in the vicinity of the film unit path of travel of such a camera supported in the housing so that the film unit may be observed once it has been advanced from the camera.

It is another object of the invention to provide an underwater housing which comrpises a first watertight and hydrostatic pressure resistant housing section for receiving and supporting a "self-developing" camera and a second watertight and pressure resistant housing section coupled to and in communication with said first housing section for enclosing a film unit path of travel, exteriorly of such a camera supported in said first section, along which a film unit is adapted to be advanced from a position within the camera and for receiving and storing a film unit so advanced along such a path of travel.

Another object is to provide such a housing which further includes a transparent print observation port in the second housing section and transparent picture taking and viewfinder ports in said first housing section.

It is still another object of the present invention to provide an underwater housing having means for disengaging a film unit from retaining means on a camera enclosed by said housing and for moving the film unit into a more favorable position for observation through a transparent port in said housing.

It is yet another object of the invention to provide an underwater housing including transparent picture taking and film unit observation ports that are disposed at an angle, preferably an obtuse angle, relative to one another.

Other objects will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings wherein:

FIG. 6 is a side elevational view, partly in section, of the camera of FIG. 1.

DESCRIPTION OF THE PREFERRED EMBODIMENT

Figure 2:
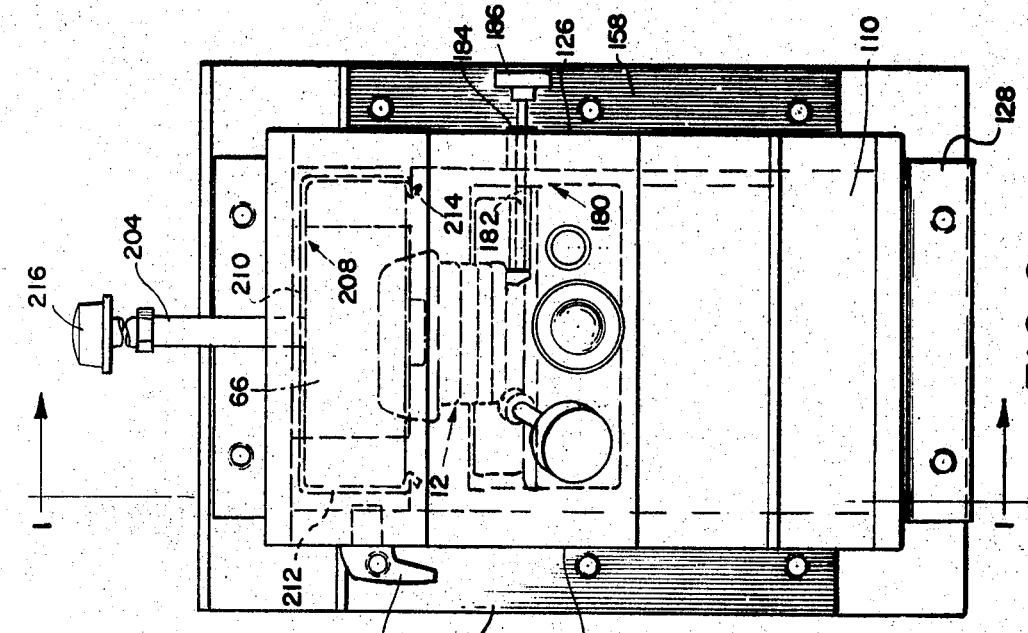
FIG. 2 is a front elevational view of the underwater housing of FIG. 1 looking through a transparent picture taking port in the front of the housing.
Figure 1:
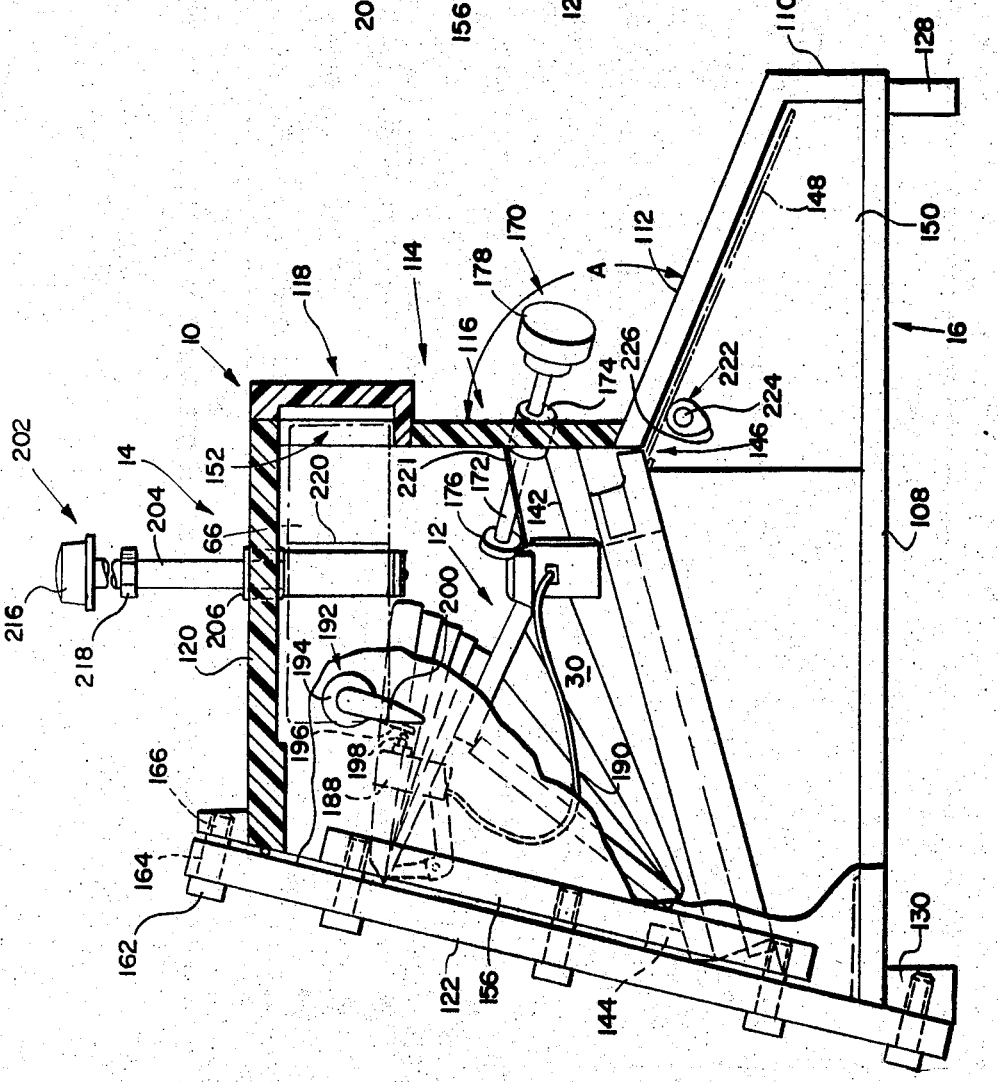
FIG. 1 is a side elevational view, partly in section, of an underwater housing embodying the present invention and a "self-developing" camera mounted in its operative position within the housing.
Figure 3:
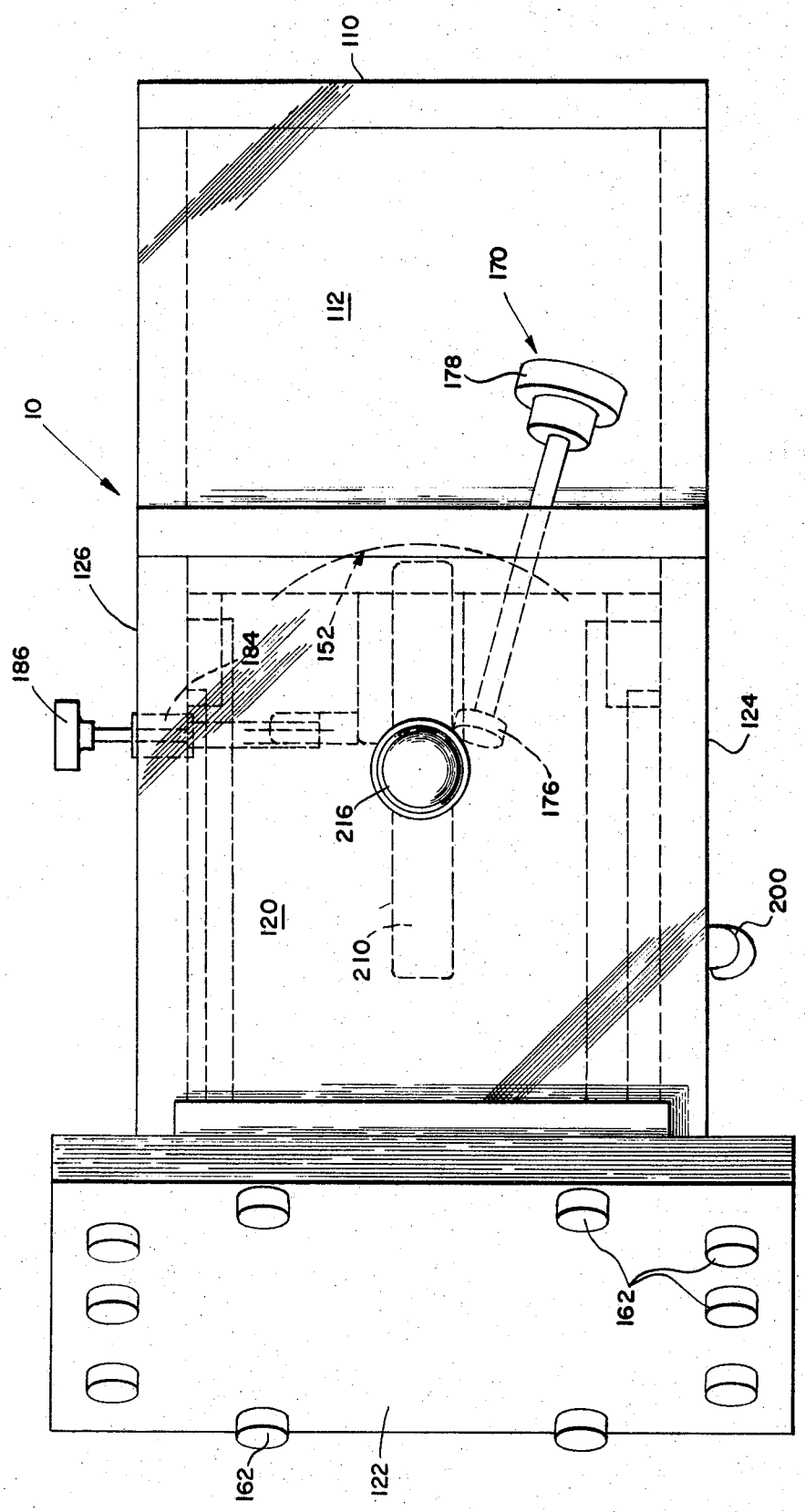
FIG. 3 is a top elevational view of the underwater housing of FIGS. 1 and 2 showing the rotational path of movement of a linear flash unit adapted to be used with the self-developing camera.

FIG. 1 of the drawings shows a side elevational view, partly in section along line 1—1 of FIG. 2, of an underwater housing 10 embodying the present invention and a self-developing camera 12 located at its operative position within the underwater housing 10.

The underwater housing 10 comprises a first or main watertight housing section 14 for receiving and supporting camera 12 and a second watertight housing section or auxiliary chamber 16 for receiving and storing a plurality of individual film units 18 that are adapted to be advanced from the camera 12.

Camera 12 and film unit 18 are key components of a new class of "self-developing" photographic systems in which the film unit is located at a position within the camera for exposure and then is advanced through a pressure-applying mechanism, to initiate processing, and out through an exit slot to the exterior of the camera without the user having to manually manipulate the film unit.

The film unit 18 includes an integral light opacification system thereby permitting film development and positive image formation to be completed in ambient light without further exposure of the photosensitive materials in the film unit. The developing and positive image formation process is self-terminating and an integral transparent window is provided for viewing the positive image. This means there is no longer any requirement for the user to "time" the processing cycle and then "peel apart" the positive and negative film elements to view the positive image.

In order to accurately describe the underwater housing 10 later in the disclosure, it is desirable, at this point, to closely examine the structure and operation of camera 12 and film unit 18.

Figure 5:
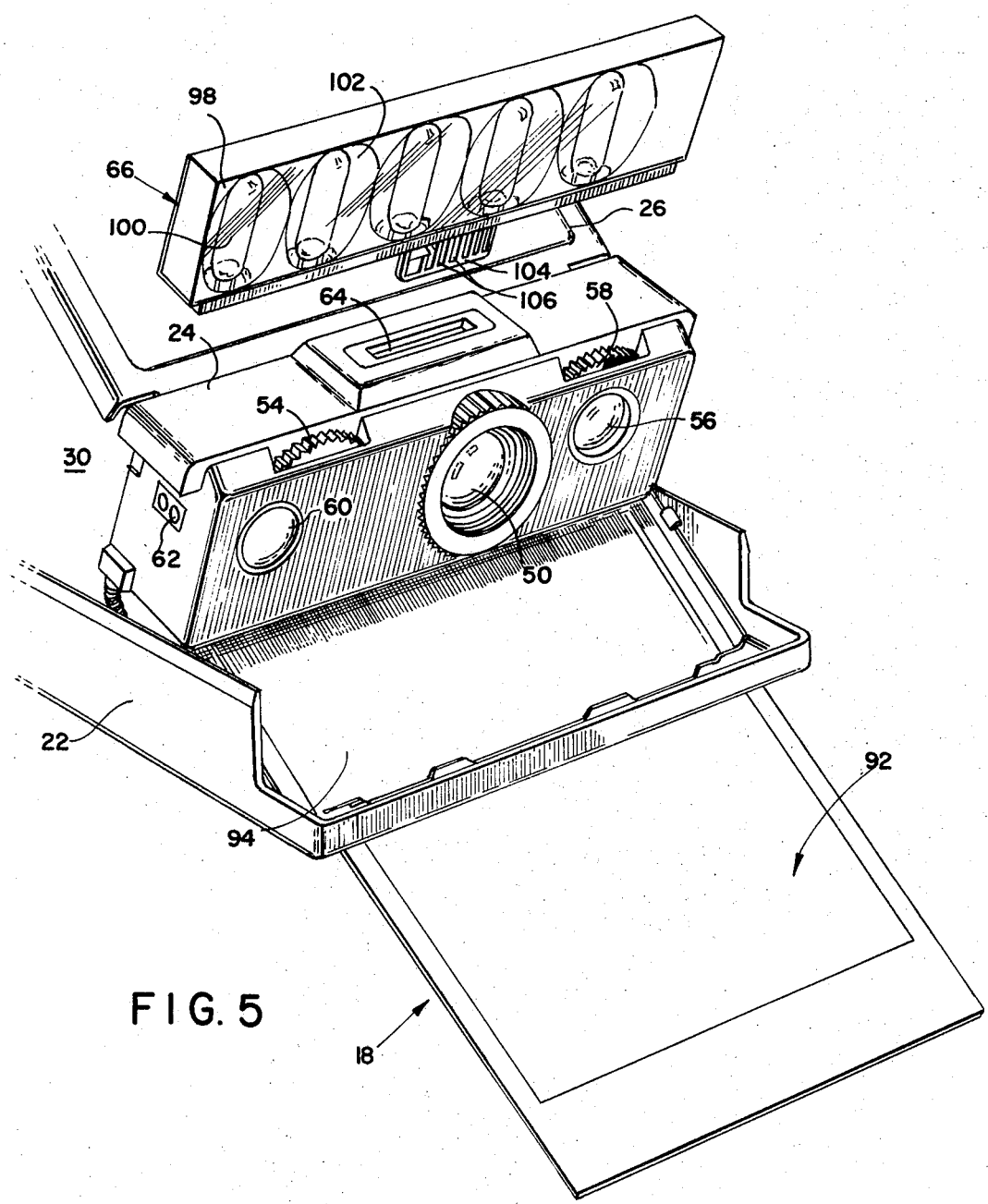
FIG. 5 is a perspective view of a portion of the "self-developing" camera shown in FIG. 1 and a linear array flash unit which is adapted to be connected to a socket on a forward section of the camera, also shown in a film unit which has been advanced to the exterior of the camera from a position within the camera.

As best shown in FIGS. 1, 5, and 6, camera 12 is a compact, folding, single lens reflex camera of the self-developing type shown in its erected operative position. It is formed by five interconnected housing sections 20, 22, 24, 26, and 28 and a cooperating, foldable, light excluding bellows 30.

The base or bottom housing section 20 includes an interior chamber 32 for receiving and supporting a container 34 having a plurality of self-developing film units 18 arranged in stacked relation therein.

Access to chamber 32 is provided by pivoting housing section 22 downwardly (counterclockwise as viewed in FIG. 6) to expose an open forward end of chamber 32 through which the film container 34 may be inserted.

A top wall 36 of container 34 has a generally rectangular exposure opening 38 therein through which light is adapted to pass to expose the forwardmost film unit 18 in the stack.

When the film container 34 is fully inserted into chamber 32, the forwardmost film unit 18 in the stack is located at the camera's exposure plane and the film container exposure opening 38 is in alignment with a coextensive rectangular opening 40 in a top wall 42 of chamber 32.

Each film unit 18 contains all of the components required to produce a positive print. Sandwiched between a transparent top sheet 44 (facing the exposure opening 38 in film container 34) and an opaque bottom sheet 46 are a plurality of superposed chemical layers (not shown) including photosensitive and image-receiving layers. At the leading end of the film unit is a pod 48 of processing fluid which, when subjected to an appropriate compressive pressure, is adapted to rupture thereby dispensing the processing fluid between predetermined chemical layers of the film unit to initiate processing. A more detailed description of film unit 18 may be found in U.S. Pat. No. 3,415,644, granted to Edwin H. Land on Dec. 10, 1968, and assigned to the same assignee as the instant invention.

Housing section 24 is pivotally coupled at one end to the forward end of base section 20. Housing section 28 is pivotally coupled at one end to the trailing end of base section 20. Housing section 26 is pivotally coupled between the opposite ends of housing sections 24 and 28. The opening between these four interconnected housing sections is enclosed by bellows 30. This type of structure permits camera 12 to be folded into a compact parallelepiped shape (not shown).

Housing section 24 supports an adjustable focus objective lens 50; a shutter mechanism 52 aligned with lens 50; a focusing wheel 54 for adjusting the focus of lens 50; a window 56 for admitting and directing light to a photocell (not shown) forming part of the camera exposure control circuit (not shown); a lighten/darken control wheel 58 for varying the amount of light impinging upon the photocell for trimming the exposure control circuit; a button 60 for actuating a cycle of camera operation; a cable release socket 62 for receiving a remote camera actuating mechanism; and a socket 64 for receiving a flash unit 66 to be described hereinafter.

Mounted on the interior surface of housing section 28 and facing the rear of objective lens 50 is a planar mirror 68.

Being a single lens reflex camera adapted to operate first in a viewing and focusing mode and then in an exposure and processing mode, camera 12 is provided with a plate-like relfex member 70. Member 70 includes a reflective focusing screen 72 on its top surface (facing housing sections 26 and 28) and a planar mirror 74 on its underside. It is pivotally coupled at its trailing end (at pivot 76) to housing section 20 for movement between a focusing position (as shown in FIG. 6) wherein member 70 is substantially parallel to the camera's exposure plane and rests atop member 42 in light blocking relation to opening 40 and an exposure position wherein reflex member 70 is pivoted upwardly (clockwise about pivot 76 as viewed in FIG. 6) and comes to rest such that it is closely adjacent to and substantially parallel with fixed mirror 68.

The optical system of camera 12 further includes a foldable viewing device 76 mounted on the exterior surface of housing section 26. It includes curved mirror 80 and an eye lens 82.

In the viewing and focusing mode of operation, camera 12 is configured as is shown in FIG. 6. Shutter 52 is open and light reflected from the scene to be photographed passes through objective lens 50 and impinges fixed mirror 68 from where it is reflected downwardly onto focusing screen 72 to form an image of the scene.

Focusing screen 72 is reflective in nature and preferably includes a blazed surface texture which directs the light from the image thereon upwardly in a diminishing cone that impinges a relatively small portion of fixed mirror 68. Mirror 68 in turn directs the cone of light towards housing section 26 and through an aperture or entrance pupil 84 therein to curve mirror 80 of viewfinder 78.

Curved mirror 80 reflects the light rearwardly to form an aerial image (designated by arrow I) of the scene which may be viewed from an eye station through the eye lens 82.

In operation, the user views an image of the scene to be photographed through viewing device 78 and turns focusing wheel 54 until the image is in sharp focus. At that point the user actuates button 60 or actuates a similar button or electrical switch on a cable release mechanism plugged into socket 62 to electrically initiate a cycle of camera operation. In a preferred embodiment electrical power is provided by a battery (not shown) in the film container 34.

First shutter 52 closes and reflex member 70 pivots upward to its exposure position thereby unblocking the forwardmost film unit 18.

Shutter 52 reopens and lens 50 directs light to the planar mirror 74 on the underside of the raised reflex member 70 which in turn reflects the light downwardly to expose the forwardmost film unit 18. After an appropriate exposure interval, which is determined by the electric exposure control circuit (not shown) that includes the photocell, the shutter 52 is once again closed and the reflex member 70 is driven downwardly to its viewing position by a small electric motor at the trailing end of housing section 20 and an appropriate linkage (neither of which is shown). At this point the shutter 52 is reopened.

As the exposure cycle is being terminated, a film advancing mechanism (not shown) which is powered by the electric motor and a connecting gear train (not shown) engages the trailing end of the exposed forwardmost film unit 18 and advances it forwardly (to the left as viewed in FIG. 6) through an opening 86 in the leading end of film container 34 and into the bite of a pair of juxtaposed cylindrical rollers 88 and 90 rotatably mounted on camera housing section 22.

At least one of the rollers 88 and 90 is adapted to be driven (by motor through the gear train) in a direction to cause the engaged film unit 18 to be advanced forwardly therebetween.

As the film unit 18 passes between the rollers 88 and 90, they apply a compressive pressure which initially causes pod 48 to rupture and dispense the processing fluid in a mass between predetermined chemical layers of the film unit. As the film unit 18 continues to advance forwardly, the rollers cause the fluid to be progressively spread imagewise in a thin uniform layer over the entire image-forming area 92 of the film unit (see FIG. 5) thereby initiating the development and diffusion transfer process.

It will be noted that an inclined light opaque panel 94 is provided on housing section 22 forwardly of rollers 88 and 90. Its function is that of a light shield to prevent ambient light from passing between rollers 88 and 90 and through film container opening 86 which may cause fogging of one or more of the film units 18 stacked in container 34.

As the film unit 18 advances from the rollers 88 and 90, the interior surface of panel 94 deflects the leading end of the film unit downwardly to a film exit slot or opening 96 in the bottom wall of housing section 22. Continued advancement of the film unit by the rollers causes the film unit to follow a substantially planar path of travel exteriorly of camera 12 and extending forwardly and downwardly from the leading end of housing section 22.

Advancement of the film unit 18 through exit slot 92 continues until the trailing end of the film unit passes through and disengages from the rollers 88 and 90 (see FIG. 6). The film unit is releasably held in this position by the frictional engagement of the edges of the bottom wall of housing section 22 defining slot 96. In a preferred embodiment, the rearward portion of the bottom wall of housing section 22 is formed of a spring-like material and is cantilevered in its construction so that an end 98, defining the trailing end of exit slot 96, is free to deflect.

In its normal relaxed condition, end 98 is located in operative relation to the leading edge of exit slot 96 to define an opening that is slightly narrower than the thickness of a film unit 18. When end 98 is engaged by the leading end of an advancing film unit, it deflects slightly downwardly thereby increasing the dimension of exit slot 96 to permit the film unit to frictionally slide therethrough. When the drive of the rollers is discontinued, the frictional forces applied to the film unit by the edges of exit slot 96 are sufficient to releasably hold the film unit in the position shown in FIGS. 5 and 6 until it is removed by the user. In a preferred embodiment of camera 12, a film unit held in exit slot 96 is pushed forwardly and is disengaged therefrom by the next film unit 18 being advanced through rollers 88 and 90.

As best shown in FIG. 5, approximately two-thirds of the film unit's image-forming area 92 is visible when the film unit's forward advancement through exit slot 96 is terminated.

When the ambient illumination is insufficient to provide light levels compatible with the proper exposure of film unit 18, a flash mode of operation may be employed. As best shown in FIG. 5, the flash socket 64 in the top wall of housing section 24 is adapted to receive and support the multi-lamp flash unit 66.

Flash unit 66 includes a transparent housing 100, two separate linear arrays of flash lamps 102 and their respective reflectors. One array of five lamps 102 faces forwardly and a second array (not shown) of five lamps 102 faces rearwardly in back to back relation with the first array.

An insulative terminal board 104 depending from the bottom of housing 100 supports two linear arrays of conductive lamp terminals 106. The first set of terminals 106 on the front surface of terminal board 104 is connected to the first array of lamps 102 and the second set of terminals 106 (not shown) on the back of board 104 is connected to the second or rearwardly facing lamps 102.

When terminal board 104 is plugged into flash socket 64, the forwardly facing set of lamps 102 are connected to the camera's flash firing circuit (not shown). This circuit includes a solid state electronic logic circuit for sequentially firing one of the forwardly facing lamps 102 in response to each cycle of camera operation. After all of the lamps 102 in the first array have been fired, the flash unit 66 is unplugged and reversed such that the second array of lamps face forwardly when the flash unit 66 is plugged into socket 64.

In a preferred embodiment, film container 34 holds 10 film units 18. Since there are 10 lamps 102 in flash unit 66, all of the film units 18 may be exposed by the flash illumination of a single flash unit 66.

A more detailed description of camera 12 may be had by referring to U.S. Pat. Nos. 3,678,831; 3,709,122; 3,709,131; 3,710,697; 3,714,879; all of which are assigned to the same assignee as the instant invention.

Turning now to the underwater housing 10, it will be seen in FIG. 1–4 that it comprises a watertight case for enclosing camera 12 and the forwardly extending film unit path of travel exteriorly of camera 12.

As noted earlier, underwater housing 10 includes a first or main housing section 14 for receiving and supporting the erected camera 12 and a second or auxiliary housing section 16 extending forwardly (to the right as viewed in FIG. 1) of housing section 14 for receiving and storing film units 18 advanced through the exit opening 96 of the camera 12 supported in housing section 14.

Structurally, underwater housing 10 includes a bottom wall 108, a leading end wall 110, a transparent film unit observation or viewing port 112, a forward wall 114 comprising a lower transparent picture taking and flash illumination port 116 and an upper flash unit manipulation chamber wall 118, a top wall 120, a rear wall 122 which also serves as a transparent viewfinder port and a pair of side walls 124 and 126.

In a preferred embodiment, all of the walls and transparent ports are formed of an acrylic plastic, e.g., Plexiglas. Wall thickness is in the range of one-fourth to three-fourths inch depending on the depth at which the housing is to be used. The illustrated housing 10 is constructed of ⅜ inch sheet stock with waterproof cemented joints and is designed to withstand hydrostatic pressures encountered at depths of up to 160 ft. One skilled in the art will appreciate that alternative construction techniques may be employed. For example, an acrylic housing 10 may be molded to provide a stronger rounded corners. Alternatively, the housing 10 may be formed of a suitable metal and include transparent glass or acrylic picture taking, flash illumination, film unit observation, and viewfinder ports.

The horizontal bottom wall 108 is generally rectangular in shape and provides a common base for the main housing section 14 and auxiliary housing section 16. In a preferred embodiment, a pair of vertically depending legs 128 and 130 are provided at the leading and trailing ends, respectivley, of bottom wall 108. On land, legs 128 and 130 elevate bottom wall 108 above a surface on which the housing 10 rests and allows the user to conveniently handle the housing 10 by grasping it along the lateral edges of bottom wall 108. In water, legs 128 and 130 serve as forward and aft "tow" handles by which the diver may grasp the housing 10 while he is swimming.

As best shown in FIG. 1, camera 12 is adapted to be supported within underwater housing section 14 with the camera's lens 50 facing taking port 116 such that the camera's lens axis (shown in dotted lines) is substantially normal to port 116.

Proper alignment of the lens axis with respect to the taking port 116 is achieved by supporting camera 12 so that its lower housing sections 20 and 22 are inclined upwardly with respect to the horizontal bottom wall 108 of underwater housing 10.

The means for receiving and supporting camera 10 includes a pair of tapered acrylic blocks 132 and 134 which are vertically disposed on bottom wall 108 adjacent side walls 124 and 126, respectively. See FIG. 4 which is a rear elevational view of housing 10 with rear wall 122 removed. The bottom of camera housing sections 20 and 22 are adapted to rest atop the inclined blocks 132 and 134 for vertically locating the camera's lens axis with respect to taking port 116.

Mounted on top of blocks 132 and 134, respectively, are a pair of side rails 136 and 138. Rails 136 and 138 are adapted to bear against the lateral sides of camera housing section 20 for providing lateral camera support and for laterally aligning the camera's lens axis with respect to taking port 116.

In addition to blocks 132 and 134 and side rails 136 and 138, the means for receiving and supporting camera 12 include a pair of forward hold-down blocks 140 and 142 and a rear hold-down block 144. The forward hold-down blocks 140 and 142 are mounted on side walls 124 and 126, respectively, and are spaced from the top forward end of tapered blocks 132 and 134 such that the leading end of camera housing section 22 may slide therebetween when camera 12 is fully inserted into underwater housing section 14. The rear hold-down block 144 is mounted on the interior surface of rear wall 122 and is adapted to bear down slightly on the upper surface of the trailing end of camera housing section 20 when rear wall 122 is secured in place. Blocks 140, 142, and 144 may be formed by any suitable material such as an acrylic plastic. In a preferred embodiment, however, at least block 144 is formed of a resilient, non-liquid absorbing material such as rubber.

As best shown in FIG. 1, the leading end of camera housing section 22 bears against the trailing end of the film unit observation port 112 and the interior surface of underwater housing rear wall 122 bears against the trailing end of camera housing section 20 thereby preventing forward and aft movement of the camera.

It will be noted that tapered blocks 132 and 134 extend forwardly from rear wall 122 but terminate short of the trailing end of the film unit observation port 112 to define an interior opening or passageway 146 between the main housing section 14 and the auxiliary housing section 16. With the camera 12 located in its operative position within main housing section 14, the camera film exit slot 96 is positioned in passageway 146 such that the forwardly extending film unit path of travel 148 (shown in dotted lines in FIG. 1), exteriorly of the camera, extends into the second housing section 16 and underlies the transparent film unit observation port 112.

Auxiliary housing 16 is formed by the forward end of bottom wall 108, the forward ends of side walls 124 and 126, leading end wall 110, and the transparent film unit observation port 112. Together these walls cooperate to define an interior chamber 150 for receiving and storing the film units 18 from camera 12.

Due to the configuration of camera 12 and the manner in which it is supported in housing section 14 for correctly orientating the camera's lens axis with respect to taking port 116, the forwardly extending film unit path of travel 148 exteriorly of camera 12 slopes downwardly towards the bottom wall 108 of underwater housing 10.

In a preferred embodiment, auxiliary housing section 16 is configured such that film unit observation port 112 slopes downwardly towards bottom wall 108 in a plane that is substantially parallel to the predetermined film unit path of travel 148. Accordingly, film unit observation port 112 is disposed at an obtuse angle A relative to picture taking port 116.

By providing an inclined film unit observation port 112, not only is port 112 in close proximity to the film unit path of travel 148 but, more importantly, port 112 is located outside of the field of view of the camera lens 50. In other words, it is important to incline port 112 downwardly from the taking port 116 so that port 112 does not intrude into or block any portion of the field of view of camera 12.

In the illustrated embodiment of underwater housing 10, the single planar transparent port 116 serves as both a picture taking port and a flash illumination port. Light emitted from a flash unit 66 on top of camera housing section 24 is transmitted outwardly through the upper portion of port 116 to illuminate the scene to be photographed, and light reflected back from the scene passes through the lower portion of port 116 to the camera's objective lens 50. As noted earlier, port 116 is preferably formed of a transparent acrylic plastic such as Plexiglas.

The uppermost section 118 of underwater housing forward wall 114 extends forwardly (to the right as viewed in FIG. 1) of port 116. In cooperation with the upper edge of port 116, the upper forward ends of side walls 124 and 126, and the forward end of top wall 120, planar wall 118 defines an interior chamber 152 which provides internal clearance for the flash unit 66 to be manipulated or reversed without having to open underwater housing 10. Details as to how the flash unit 66 is reversed will be provided later in the disclosure.

Figure 4:
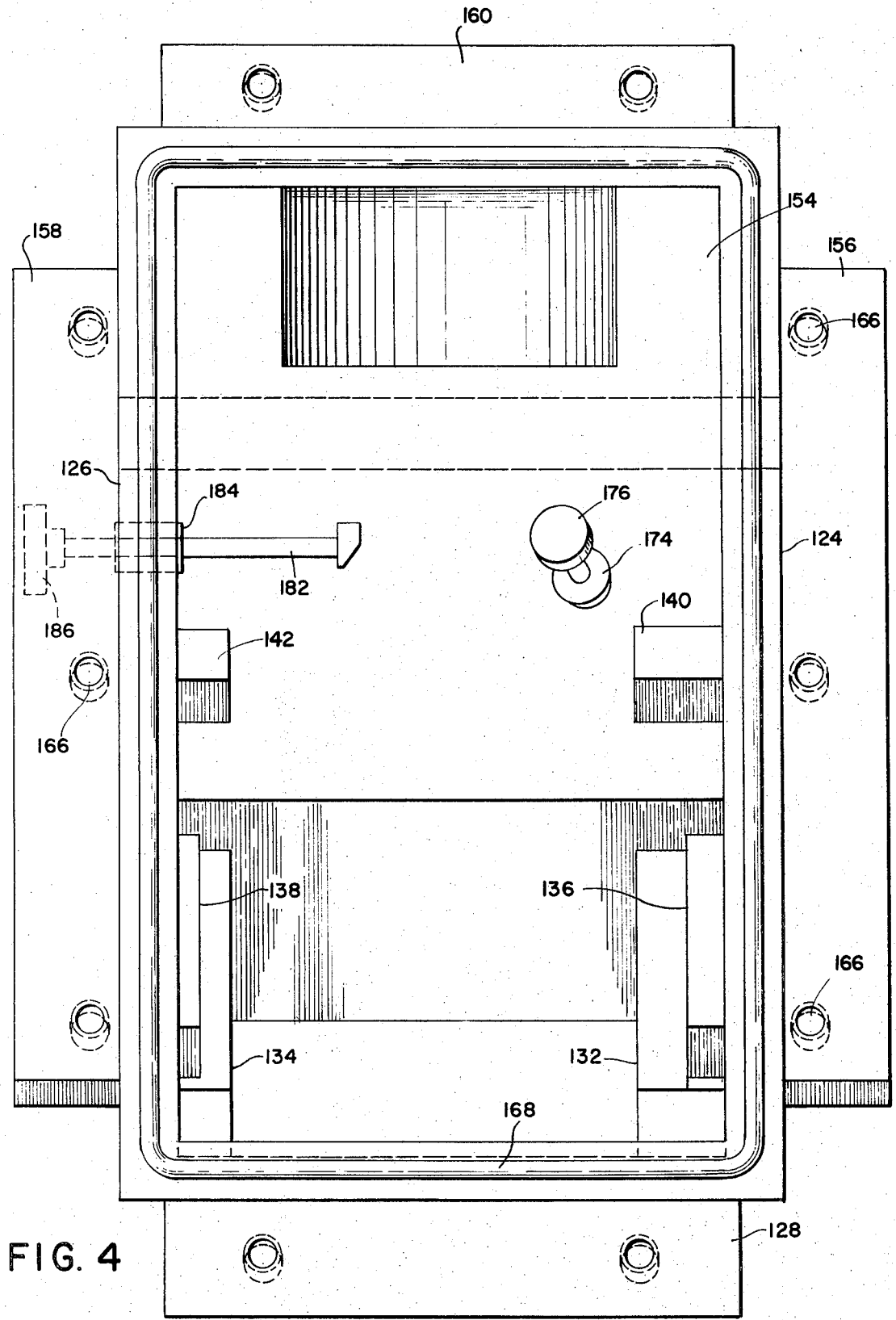
FIG. 4 is a rear elevational view of the housing of FIGS. 1, 2, and 3 without the camera mounted therein and with the rear wall of the housing removed.

Access for loading camera 12 into main housing section 14 is through a rear opening 154 (see FIG. 4). Opening 154 is generally rectangular and is defined by the trailing ends of top wall 120, side walls 124 and 126 and bottom wall 108. In order to releasably secure transparent rear wall 122 in watertight closing relation to opening 154, four outwardly extending retaining flanges are provided. Side flanges 156 and 158 are secured to the trailing ends of side walls 124 and 126. Top flange 160 is secured to top wall 120 and rear support leg 128 secured to the bottom wall 108 serves as the fourth flange.

Rear wall 122 is generally rectangular in shape and is dimensioned such that its edges overlie flanges 156, 158, 160, and 130. In the illustrated embodiment, rear wall 122 is releasably secured to these four flanges by means of a plurality of stainless steel or chrome plated screws 162 which extend through holes 164 in rear wall 122 and into matching threaded holes 166 in the appropriate retaining flanges. It will be noted that other means such as spring loaded compression clamps may be used as an alternative method of securing the rear wall 122 to the rear of underwater housing 10.

The interface between rear wall 122 and the rear of underwater housing 10 is rendered watertight by employing an O ring seal. As best shown in FIG. 4, a generally rectangular channel 168 for receiving a resilient O ring (not shown) is milled in walls 120, 124 and 126, and 108 surrounding rear opening 154. When screws 162 are tightened, rear wall 122 compresses the O ring to effect the watertight seal.

It will be noted that lateral edge portions of rear wall 122 and flanges 156 and 158 extending outwardly beyond side walls 124 and 126 provide convenient gripping handles by which the diver may grasp underwater housing 10 while observing the camera viewfinder 78 through the transparent rear wall or viewfinder port 122. Camera 12 also includes a numerical film counter at the rear of housing section 20 that may be viewed through transparent rear wall 122.

Operation of camera 12 from a position exteriorly of underwater housing 10 is accomplished by means of a plurality of watertight control members which pass through the walls of housing 10.

During the viewing and focusing mode of operation, the diver views an image of the scene provided by viewing device 78 through viewfinder port 122 and adjusts a focusing control member 170 which passes through the right side of taking port 116 and is coupled to focusing wheel 54 on the front housing 24 of camera 12.

As best shown in FIGS. 1 and 2, focusing control member 170 comprises a shaft 172 which is rotatably mounted in a watertight bearing 174 in taking port 116. The interior end of shaft 172 holds a friction wheel 176, preferably formed of a resilient material such as rubber, which is arranged to frictionally engage the periphery of camera focus wheel 54. Alternatively, wheel 176 may be provided with teeth for positively engaging the edge of focus wheel 54. A suitable knob 178 is provided at the opposite and exterior end of shaft 172 to facilitate the turning of shaft 172 to adjust the focus of camera 12.

It will be noted that shaft 172 is angled outwardly from the camera's optic axis to insure that it does not intrude into the camera's field of view. Alternatively, a different type of focus control may be mounted on side wall 124. It would consist of a slide arm which passes through side wall 126 in a direction normal thereto and is adapted to frictionally engage focus wheel 54 to cause it to turn in response to translational motion of the slide arm.

The camera's automatic exposure control circuit is adjusted for the appropriate underwater lighting conditions when the exposure is to be made by ambient illumination. For example, if the diver is photographing in clear shallow water in an area that has a highly reflective sandy bottom and the ambient illumination is provided by bright overhead sunlight, the camera wheel 58 will have to be moved to "darken" to compensate for bright lighting condition. At deeper depths, or in more turbid water, or in an area having a dark rocky or foliage covered bottom, wheel 58 would have to be moved to "lighten."

As best shown in FIG. 2, a lighten/darken control member 180 is preferably mounted in underwater housing side wall 126. It includes a slide arm 182 which slidably passes through a watertight bearing 184 in wall 126. The interior end of arm 182 frictionally engages the periphery of camera wheel 58 and is preferably covered with a resilient material such as rubber to insure good frictional contact with the outer edge of wheel 58. Again, a toothed cam could be used for positive engagement. A knob 186 is provided on the exterior end of arm 182 to facilitate grasping arm 182 and moving it inwardly and outwardly in a direction normal to wall 126 to adjust wheel 58.

Alternatively, the lighten/darken control member may take the form of a control similar to control member 170. It would pass through the left side of the taking port 116 and operate in a rotational rather than a translational mode. However, such a control must be positioned carefully to insure that it does not intrude into the camera's field of view of block the camera photocell window 56.

As noted earlier, camera 12 may be actuated by pressing button 60 on the front face of camera housing section 24 or alternatively by actuating a remote camera start switch plugged into the cable release socket 62 on the side of camera housing 24.

The illustrated underwater housing 10 employs the latter approach. As best shown in FIG. 1, a normally open micro switch 188 is mounted on the interior surface of right side wall 124. Open switch 188 is connected to the terminals of cable release socket 62 on camera 12 by means of a two wire cable 190. This electrical connection places open switch 188 in parallel with an open camera start switch within camera housing 24 that is adapted to be closed by depressing button 66 to initiate a cycle of camera operation.

Switch 188 is adapted to be actuated by actuating control member 192 mounted in underwater housing side wall 124. In a preferred embodiment, it includes a shaft (not shown) that is rotatably mounted in a suitable watertight bearing 194 and passes through side wall 124 in a direction that is normal thereto. A switch actuating arm 196 depends from the interior end of the shaft and is disposed so that its lower end will engage a depressable actuating button 198 on switch 188 in response to rotating the shaft in a clockwise direction (as viewed in FIG. 1). Exteriorly of underwater housing 10, a handle 200 is mounted on the opposite end of the shaft to pivot arm 196. Actuating control member 192 is suitably spring biased and stopped such that its actuating arm 196 normally does not depress switch button 198. Such construction allows switch 188 to be actuated by rotating handle 200 in a clockwise direction after which the handle 200 may be released to return to its normal position (shown in FIG. 1) under the influence of the biasing spring.

As noted earlier, camera 12 is adapted to operate in a flash mode of operation by plugging the linear flash unit 66 into the socket 64 mounted on top of camera housing section 24. This not only connects the flash unit to the camera's flash fire circuit, but it also reconfigures the camera for follow focus exposure control.

Details of this reconfiguration may be found in the copending application of John P. Burgarella et al., Ser. No. 333,331, filed on Feb. 16, 1973, said copending application being assigned to the same assignee as the instant application.

The linear flash unit 66 has five forwardly facing and five rearwardly facing flash lamps 102. After the first five lamps have been fired, the flash unit is removed from the socket 64, reversed by turning it 180°, and reinserted into socket 64 to connect the second group to lamps 102 to the camera's flash fire circuit.

In order to manipulate a flash unit 66 within underwater housing 10 from a position exteriorly thereof, housing 10 is provided with a flash unit manipulation control member 202. It includes a vertically disposed and rotatably mounted shaft 204 which passes through an appropriate watertight bearing 206 mounted in the top wall 120 of underwater housing 10 such that the longitudinal axis of shaft 204 is centered over socket 64. Bearing 206 is also of the type that permits translational motion of shaft 204 in a direction normal to wall 120.

The lower or interior end of shaft 204 includes means for receiving and supporting a linear flash unit 66. Such means may simply include a screw thread at the lower end of the shaft that is adapted to be screwed into an appropriate hole in the top of the flash unit housing. The illustrated embodiment of such receiving and support means includes a spring clamp 208 for grasping the flash unit by the lateral sides of its protective housing. As best shown in FIG. 2, clamp 208 is formed of a single piece of resilient material, such as stainless or a plastic or rubber coated steel and is shaped to conform to the top and side walls of the flash unit housing 100. A central horizontal section 210 is secured at its midpoint to the lower end of shaft 204 and is adapted to overlie the top wall of the flash unit housing 100. The side members 212 are stressed such that they apply a compressive force on the side walls of the flash unit housing and hold a pair of inwardly bent retaining flanges 214, at the lower ends of side member 212, under the lateral ends of the lower wall of the flash unit housing.

With a flash unit 66 supported in clamp 208 as shown in FIG. 1, the user pushes downwardly on a knob 216 coupled to exterior end of shaft 204 to lower flash unit 66 and insert its depending terminal board 104 into the camera flash socket 64. Preferably, a stop or nut 218 is provided on the exterior end of shaft 204 for engaging top wall 120 to limit the downward travel of shaft 204. This prevents damage to the flash unit 66 and flash socket 64 and also provides the user with a visual indication that the flash unit 66 is fully inserted in flash socket 64.

In order to reverse the flash unit 66, shaft 204 is lifted to its fully raised position shown in FIG. 1 so that the bottom of flash unit housing 100 is higher than the top of camera viewing device 78. Shaft 204 is then rotated to swing the flash unit 66 through a 180° arc. It will be noted that the forwardly extending chamber 152 in the upper part of the forward wall of underwater housing 10 provides the necessary forward clearance for rotating flash unit 66. Folding viewing device 78 is spring biased upwardly to its fully raised position. As the trailing end of the flash unit swings over the top of viewing device 78, the flash unit depresses the viewing device 78 slightly to provide rearward clearance. Once the flash unit 66 has been reversed, shaft 204 is lowered to connect flash unit 66 to flash socket 64.

As noted earlier, transparent port 116 serves as both a flash illumination port and a picture taking port. Light emitted from one of the forwardly facing flash lamps 102 passes through the upper portion of port 116 to illuminate the scene to be photographed and light reflected back from the scene passes through the lower portion of port 116 to the camera lens 50.

It has been found that some of the light emitted from a flash lamp tends to be reflected by the interior surface of port 116 and into camera lens 50. Such reflection tends to cause overexposed areas or flare on the resultant positive print. This problem is eliminated by providing a flash isolation shield 221 between the flash unit 66 and camera lens 50.

As best shown in FIG. 1, shield 221 preferably includes a light opaque plate-like member which may be formed of any suitable material such as sheet metal or plastic. It extends forwardly from the top of camera housing section 24 to the interior surface of port 116 and laterally to the interior surfaces of underwater housing side walls 124 and 126 and includes an opening therein for shaft 172.

In preparation for an underwater dive, the diver removes the rear wall 122 of underwater housing 10 and attaches a flash unit 66 to the holding clamp 208 on the interior end of the flash unit manipulation control member 202.

The free end of the actuating cable 190 is plugged into the camera socket 62 and, with the flash unit 66 located in its raised position, camera 12 is slidably inserted through the rear opening 154 into main housing section 14.

Once camera 12 is located in its fully inserted operative position with focus control member 170 and lighten/darken control member 180 engaged with the appropriate wheels 54 and 58 on camera housing section 24, the O ring sealed rear wall 122 of underwater housing 10 is secured in place.

When submerged, the underwater housing 10 having a camera 12 supported therein has a neutral or slightly positive buoyancy. It will be apparent to those skilled in the art that the buoyancy is a function of the combined weight of the housing 10 and camera 12 in relation to the volume of water displaced by housing 10. Should it be necessary to adjust the buoyancy so that it is more negative, ballast weights may be placed within housing 10. Such ballast may be accommodated in main housing section 14 in the open space below the supported camera and between the support blocks 134 and 136.

When the diver is swimming underwater, it is convenient to "tow" the enclosed camera along at his side by one of the forward or aft tow handles 128 or 130.

Once a subject or scene is located, the diver grasps the underwater housing 10 by the protruding rear side handles and observes the eye lens 82 of the viewing device 78 through the rear transparent viewing port 122 to frame the subject. At this point the diver mades a decision on exposure control. He can use the camera in its ambient mode and make a suitable adjustment of the lighten/darken control using member 180 or he may elect to use the flash mode of operation by depressing control member 202 to plug in the flash unit 66 and automatically reconfigure the camera 12 for follow focus operation.

While viewing the framed subject through viewing port 122, the diver focuses lens 50 by rotating focus control member 170. If his subject is stationary, the diver may make his final focus adjustment by moving the housing 10 slightly toward or away from his subject.

The camera is actuated by closing micro switch 188 through the actuating control member 192 mounted in right side wall 124. A complete cycle of camera operation follows whereby the forwardmost film unit 18 in container 34 is exposed, advanced through the processing rollers 88 and 90 and is advanced through camera exit opening 96 and along the substantially planar film unit path of travel 148 beneath the transparent film unit observation port 112. The entire cycle takes approximately 1.5 seconds.

As best shown in FIGS. 1 and 5, the ejected film unit 18 is releasably retained on the leading end of camera 12 by the frictional retaining members associated with the film exit opening 96.

In the retained position, approximately two-thirds of the film unit's image-forming area is visible through film unit observation port 112.

The initial outlines of the image appear in approximately 20 seconds and the user can determine whether he has framed correctly. Within another 20 seconds the image is sufficiently defined for him to evaluate whether or not he has focused correctly. Within a minute after ejection, there is sufficient detail for him to make an informed judgment about exposure control.

Generally the diver can obtain enough information about quality of the positive print by viewing the exposed two-thirds of the image-forming area. When the next exposure is made, the second film unit being advanced through the exit opening 96 dislodges the retained print, by advancing it slightly forwardly (to the right as viewed in FIG. 1) so that it falls to the bottom of the storage chamber 150. In one embodiment, at least those portions of side walls 124 and 126 forming chamber 150 may be formed of transparent material so that the entire image-forming area of first print at the bottom of chamber 150 may be observed therethrough.

While the above embodiment is operable, it is preferable to observe the entire image-forming area of the first film unit before making the second exposure. This may be done in one of two ways.

First, if the camera is suitably constructed, the film retaining means may be rendered inoperative so that the film unit is completely ejected from camera 12 and falls to the bottom of chamber 150. This is the simplest and most practical solution to the problem.

Fortunately, the illustrated camera 12 may be modified in this manner. As noted earlier, the film retaining means includes a cantilevered resilient portion of the bottom wall of camera housing section 22 that cooperates with the fixed leading edge of exit opening 96 to frictionally hold the trailing end of the ejected film unit 18 therebetween. By inserting small metal or plastic shims at the edges of opening 96, the free end 98 of the rear cantilevered section may be deflected downwardly (as viewed in FIG. 6) to enlarge the effective opening of exit slot 96 and allow the film unit 18 to be completely ejected by the momentum imparted by rollers 88 and 90. Advantageously, the film retaining mechanism is restored to its operative state simply by removing the shims.

If the camera is of the type that does not allow the film retaining mechanism to be rendered inoperative without extensive modification of the camera or without the ability to restore the mechanism to its operative state, then the second method must be employed. That is, the underwater housing 10 must be provided with means for disengaging a retained film unit from the camera film retaining mechanism.

One example of such a mechanism is shown in FIG. 1 of the drawing. It includes a friction cam 222 in chamber 150 that is pivotally mounted on the interior end of a shaft 224 which is rotatably mounted in a watertight bearing (not shown) in left side wall 126. Cam 222 is positioned beneath the film unit path of travel 148 and is eccentric in its shape. A high lobe 226 of cam 222 is dimensioned to frictionally engage the underside of the retained film unit 18 to advance it slightly to the right in response to a clockwise rotation of shaft 224 (as viewed in FIG. 1). Prior to an exposure and film unit ejection, the cam is rotated so that the high lobe 226 points downwardly towards underwater housing bottom wall 108 and is out of the film path 148. After the film unit is ejected, the cam is rotated (clockwise) and the high lobe 226 frictionally engages and advances the retained film unit slightly to the right so that the trailing edge is disengaged from the film unit retaining mechanism on the camera. Once it is disengaged, the film unit falls to the bottom of chamber 150 to permit viewing of its entire image-forming area through film unit observation port 112.

Since certain changes may be made in the above product without departing from the scope of the invention herein involved, it is intended that all matter contained in the above description or shown in the accompanying drawings shall be interpreted as illustrative and not in a limiting sense.

I claim:

1. An underwater housing for use with a self-developing camera of the type including means for advancing a film unit from a position within the camera, through an exit opening in the camera, and along a substantially planar predetermined path of travel exteriorly of the camera, said underwater housing comprising:
   a watertight case for receiving and supporting such a self-developing camera, said watertight case being configured to completely enclose the camera and the substantially planar predetermined film unit path of travel exteriorly of the camera;
   means for receiving and storing a plurality of film units advanced from such a self-developing camera supported within said watertight case; and
   means defining a transparent section in said watertight case in the vicinity of the substantially planar predetermined film unit path of travel exteriorly of such a self-developing camera supported within said watertight case for viewing a film unit advanced along the predetermined path within said watertight case from a position exteriorly of said watertight case.

2. An underwater housing as defined in claim 1 wherein said means for receiving and storing film units includes a chamber within said watertight case and said chamber is defined, at least in part, by said transparent section.

3. An underwater housing as defined in claim 1 wherein such a self-developing camera includes an objective lens and said underwater housing further includes a transparent picture taking port for transmitting light to the objective lens.

4. An underwater housing as defined in claim 3 wherein said watertight case includes a forward side which the objective lens of the camera is adapted to face when the camera is supported within said watertight case and said picture taking port and said transparent section are both located on said forward side of said case.

5. An underwater housing as defined in claim 3 wherein the camera's objective lens has a predetermined angular field of view and said transparent section is disposed at an angle with respect to said picture taking port so that said transparent section does not intrude into field of view of the lens.

6. An underwater housing as defined in claim 5 wherein said angle is an obtuse angle.

7. An underwater housing as defined in claim 3 wherein such a self-developing camera includes a viewing device and said underwater housing including a transparent viewing device port through which the viewing device may be observed from a position exteriorly of said underwater housing.

8. An underwater housing as defined in claim 1 further including control means on said watertight case for operating such a self-developing camera supported within said watertight case from a position exteriorly of such a watertight case.

9. An underwater housing as defined in claim 8 wherein said control means includes means for actuating a camera start button.

10. An underwater housing as defined in claim 9 wherein said control means includes means for focusing an objective lens on the camera.

11. An underwater housing as defined in claim 9 wherein said control means includes means for adjusting a camera exposure control system.

12. An underwater housing for use with a self-developing camera of the type including means for advancing a film unit from a position within the camera, through an exit opening in the camera, and along a predetermined film unit path of travel exteriorly of the camera, said underwater housing comprising:
a first housing section for receiving and supporting such a self-developing camera;
a second housing section for receiving and storing film units advanced from such a self-developing camera supported by said first housing section, said second housing section being coupled to said first housing section such that at least a major portion of the predetermined film unit path of travel extends into said second housing section and said first and second housing sections cooperate to completely enclose the camera and film unit path of travel in a watertight manner; and
means defining an interior passageway providing communication between said first and second housing sections and through which a film unit being advanced from the exit opening of such a self-developing camera supported by said first housing section may pass to advance into said second housing section along the predetermined film unit path of travel.

13. An underwater housing as defined in claim 12 wherein said second housing section includes a transparent film unit observation port for viewing film units advanced into said second housing section.

14. An underwater housing as defined in claim 13 where said transparent film unit observation port is disposed in overlying relation to the predetermined film unit path of travel extending into said second housing.

15. An underwater housing as defined in claim 13 wherein such a self-developing camera includes an objective lens and a viewing device and said first housing section includes a transparent picture taking port and a transparent viewing device port configured to be aligned, respectively, with the objective lens and viewing device when such a self-developing camera is supported in said first housing section.

16. An underwater housing as defined in claim 15 wherein the camera film exit opening is positioned below the objective lens and the predetermined film unit path of travel extends forwardly and downwardly of the objective lens and said transparent film unit observation port on said second housing section extends forwardly and downwardly of said transparent picture taking port on said first housing section.

17. An underwater housing as defined in claim 15 wherein said transparent film unit observation port is disposed at an obtuse angle with respect to said transparent picture taking port.

18. An underwater housing as defined in claim 15 further including control means mounted on said first housing section and adapted to be operatively associated with such a camera supported in said first housing section for controlling the operation of the camera from a position exteriorly of said underwater housing.

19. An underwater housing as defined in claim 15 wherein said first housing section includes one removable wall providing access for loading such a self-developing camera into said first housing section.

20. An underwater housing as defined in claim 19 wherein said one wall includes said transparent viewing device port.

21. An underwater housing for use with a self-developing camera of the type including means for advancing a film unit from a position within the camera, through an exit opening in the camera, and along a substantially planar predetermined path of travel exteriorly of the camera, and means for releasably retaining one end of a film unit advanced along the predetermine path of travel, said underwater housing comprising:
a watertight case for receiving and supporting such a self-developing camera, said watertight case being configured to completely enclose the camera and the substantially planar predetermined film unit path of travel exteriorly of the camera;
means defining a transparent section in said watertight case in the vicinity of the substantially planar predetermined film unit path of travel exteriorly of such a self-developing camera supported within said watertight case for viewing a film unit advanced along the predetermined path within said watertight case from a position exteriorly of said watertight case; and
means for disengaging a retained film unit from the retaining means of the camera.

22. An underwater housing for use with a self-developing camera of the type including an objective lens and means for advancing a film unit from a position within the camera, through an exit opening in the camera, and along a predetermined film unit path of travel exteriorly of the camera and extending forwardly of the objective lens, said underwater housing comprising:

a watertight case for enclosing such a self-developing camera and the predetermined film unit path of travel exteriorly of the camera;

support means within said watertight case for supporting such a self-developing camera;

means defining a first transparent section in said watertight case for transmitting light to the objective lens of such a self-developing camera supported in said case;

means defining a second transparent section in said watertight case for observing a film unit within said watertight case that has been advanced along the predetermined film unit path of travel, said second transparent section being configured to extend forwardly of said first transparent section and overlay the predetermined film unit path of travel extending forwardly of the objective lens of such a self-developing camera supported within said watertight case; and means defining a chamber within said watertight case for receiving and storing a plurality of film units advanced from such a self-developing camera supported within said watertight case.

23. An underwater housing as defined in claim 22 wherein said means defining said chamber includes said second transparent section of said watertight case.

24. An underwater housing as defined in claim 22 wherein such a self-developing camera includes a viewing device and said watertight case further includes a third transparent section located in position for observing the viewing device of such a self-developing camera supported within said watertight case.

25. An underwater housing as defined in claim 22 wherein said second transparent section is disposed at an obtuse angle with respect to said first transparent section.

26. An underwater housing for use with a self-developing camera of the type including an objective lens, means for advancing a film unit from a position within the camera, through an exit opening in the camera, and along a predetermined film unit path of travel exteriorly of the camera and extending forwardly of the objective lens, and means for releasably retaining one end of a film unit advanced along the predetermined path of travel, said underwater housing comprising:

a watertight case for enclosing such a self-developing camera and the predetermined film unit path of travel exteriorly of the camera;

support means within said watertight case for supporting such a self-developing camera;

means defining a first transparent section in said watertight case for transmitting light to the objective lens of such a self-developing camera supported in said case;

means defining a second transparent section in said watertight case for observing a film unit within said watertight case that has been advanced along the predetermined film unit path of travel, said second transparent section being configured to extend forwardly of said first transparent section and overlay the predetermined film unit path of travel extending forwardly of the objective lens of such a self-developing camera supported within said watertight case; and means within said watertight case for disengaging a film unit retained by the retaining means of the camera.

27. An underwater photographic system comprising:

a self-developing camera including:

a camera housing;

a film unit exit opening in said camera housing; and means for advancing a film unit from a position within said camera housing, through said exit opening, and along a substantially planar film unit path of travel exteriorly of said camera housing;

in combination with an underwater housing including:

a watertight case for receiving and supporting said self-developing camera, said watertight case being configured to completely enclose said camera and said substantially planar predetermined film unit path of travel exteriorly of said camera housing;

means defining a first transparent section in said watertight case in the vicinity of said substantially planar predetermined film unit path of travel exteriorly of said camera housing for viewing a film unit advanced along said predetermined path of travel within said watertight case from a position exteriorly of said watertight case; and means defining an interior chamber within said watertight case for receiving and storing film units advanced from said camera.

28. The underwater photographic system of claim 27 wherein said means defining said interior chamber includes said first transparent section.

29. The underwater photographic system of claim 27 wherein said camera further includes an objective lens located on said camera housing so that said substantially planar predetermined film unit path of travel extends forwardly and downwardly of said objective lens and said underwater housing further includes means defining a second transparent section in said watertight case disposed in alignment with said objective lens for transmitting light therethrough to said objective lens.

30. The underwater photographic system of claim 29 wherein said first transparent section is disposed at an obtuse angle with respect to said second transparent section.

* * * * *